Figure 1:
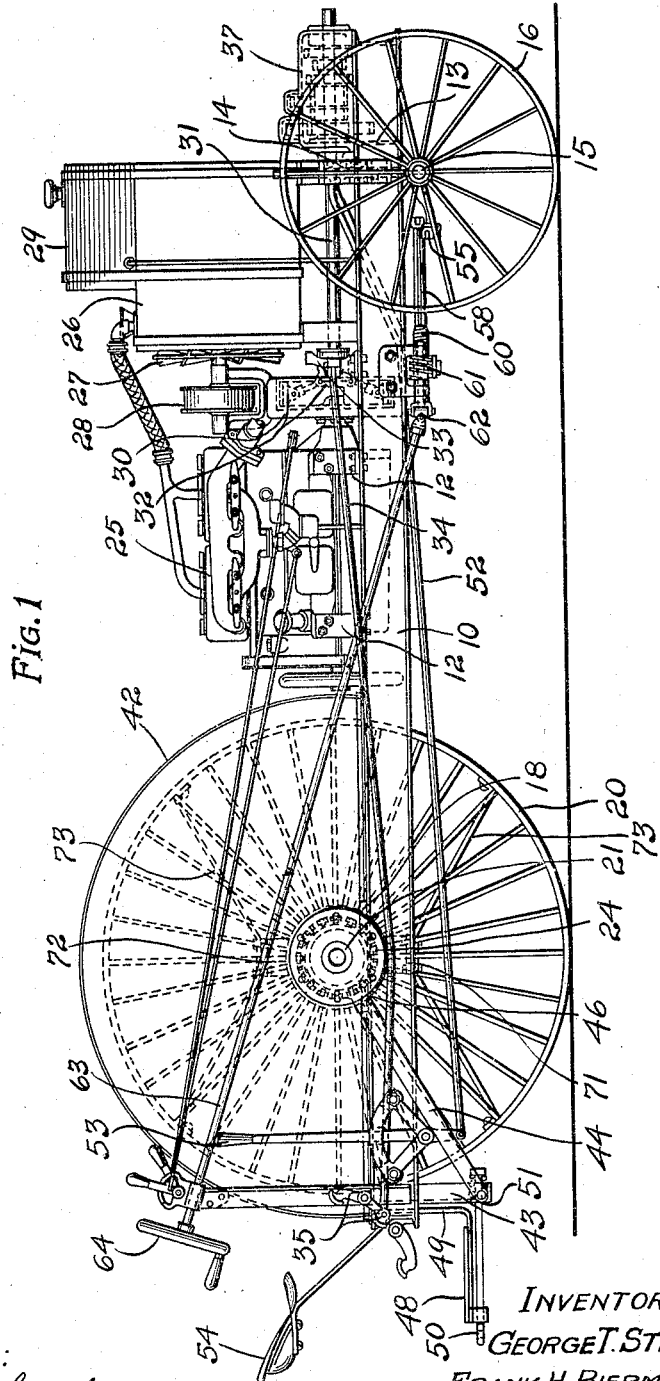

G. T. STRITE & F. H. BIERMAN.
TRACTION ENGINE.
APPLICATION FILED JAN. 16, 1914.

1,138,996.

Patented May 11, 1915.
3 SHEETS—SHEET 1.

WITNESSES:
Geo. E. Eckland
H. A. Bowman.

INVENTORS.
George T. Strite.
Frank H. Bierman.
BY
ATTORNEY

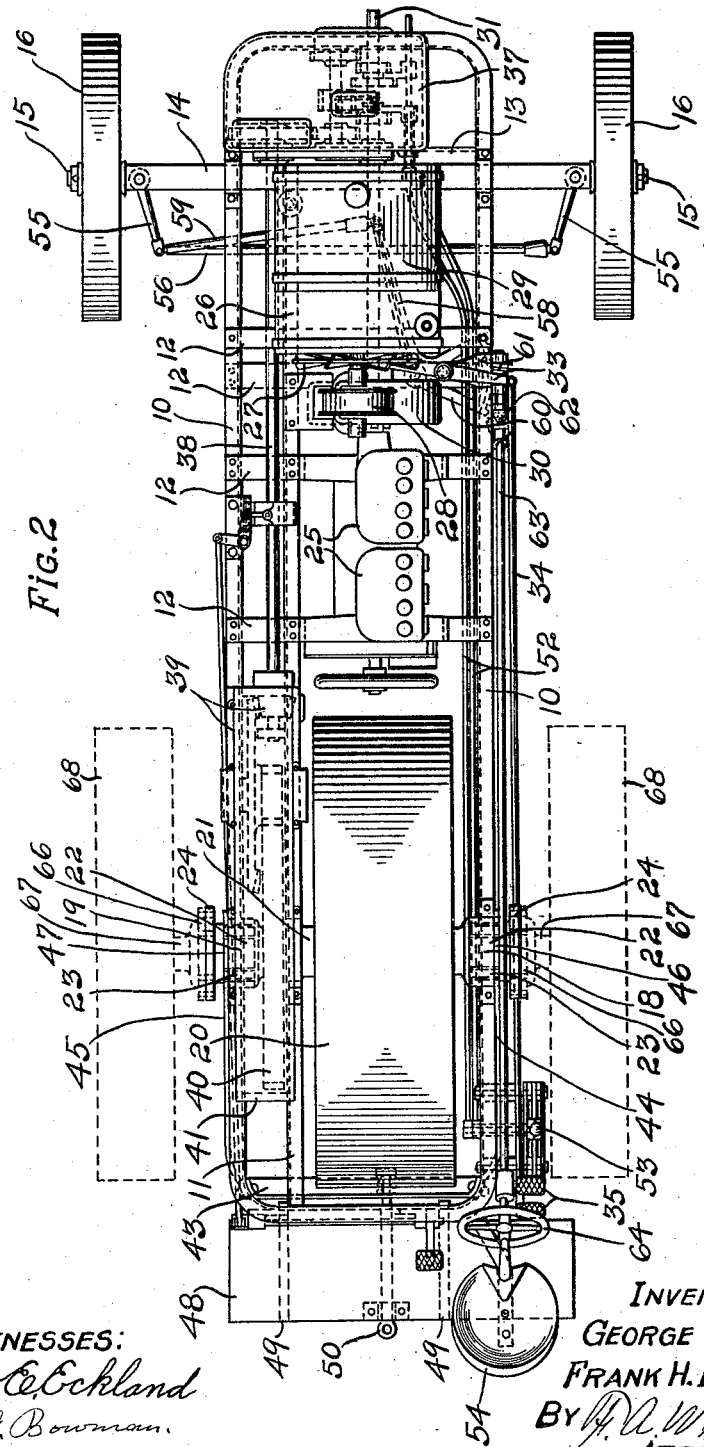

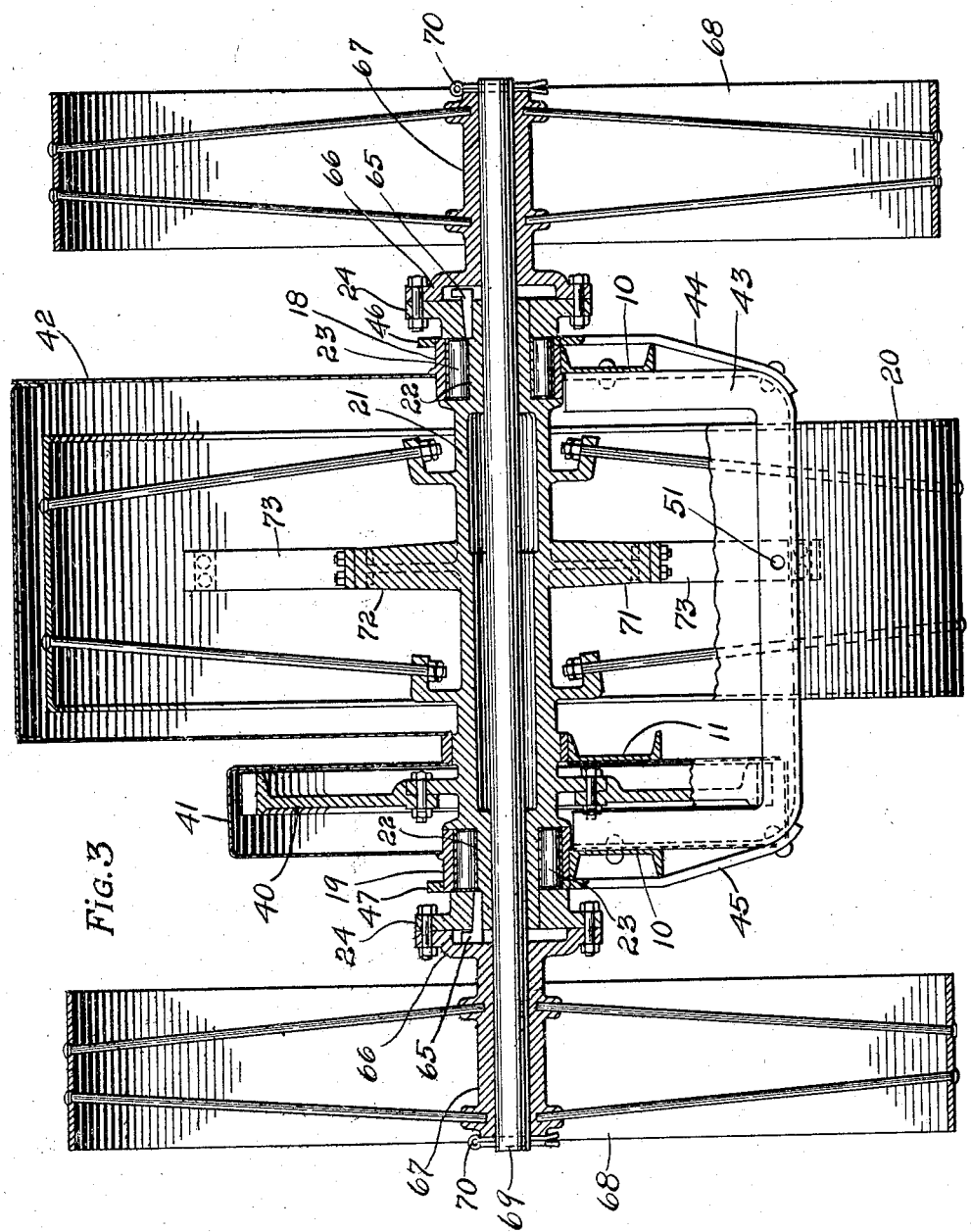

UNITED STATES PATENT OFFICE.

GEORGE T. STRITE AND FRANK H. BIERMAN, OF MINNEAPOLIS, MINNESOTA, ASSIGNORS OF ONE-FIFTH TO HOWARD J. BIERMAN AND ONE-FIFTH TO ENSLEY L. STRITE, BOTH OF MINNEAPOLIS, MINNESOTA, AND ONE-FIFTH TO J. S. CLAPPER, OF BILLINGS, MONTANA.

TRACTION-ENGINE.

1,138,996. Specification of Letters Patent. Patented May 11, 1915.

Application filed January 16, 1914. Serial No. 812,470.

*To all whom it may concern:*

Be it known that we, GEORGE T. STRITE and FRANK H. BIERMAN, citizens of the United States, residing at Minneapolis, in the county of Hennepin and State of Minnesota, have invented certain new and useful Improvements in Traction-Engines, of which the following is a specification.

Our invention relates to traction engines of the type in which the tractive power is exerted through a single wheel and no differential gearing is employed. In traction engines of this type, when the engine is turned it is in effect pivoted on the bearing portion of the single traction wheel.

It is an object of our invention to provide a traction engine of this type with double steering wheels at the front so positioned relative to the traction wheel that the traction engine may be used in cultivating corn or cotton and the traction wheel may run between two rows of said plants and the steering wheels between pairs of rows at each side thereof.

It is a further object of our invention to provide a frame for the traction engine of peculiarly simple and efficient construction and so proportioned as to its parts that the traction wheel shall support the said frame in balanced relation and the motor and transmission will be carried by said frame in such manner as to be easily accessible.

It is an important object of our invention to provide a drawbar for the engine which shall be directly connected with the axle of the traction wheel so that the tractive force exercised by the traction wheel will be transmitted to the point of draft directly and not through the frame of the machine. This will prevent the straining of the frame which so often results where the tractive force is transmitted through the frame to the draw-bar, and which straining frequently has the effect of placing the bearings of the machinery of the engine out of alinement and causing rapid deterioration or complete destruction of the machine.

It is a further object of our invention to provide a means for extending the axle or wheel hub of the traction wheel so as to attach thereto one or more additional wheels for receiving the weight and aiding in the propulsion of the engine when the same is used on soft ground. Since no differential is provided in our machine we make these extra bearing wheels of somewhat less diameter than that of the main traction wheel, so that in turning, the engine will pivot on the single traction wheel.

The full objects and advantages of our invention will appear in connection with the detailed description thereof and are particularly pointed out in the claims.

In the drawings, illustrating the application of our invention in one form,—Figure 1 is a side elevation of our complete traction engine. Fig. 2 is a plan view of the same showing in dotted lines where the extra traction wheels would be applied. Fig. 3 is a rear elevation taken principally on a section line through the axis of the traction wheel and showing the extra traction wheels attached.

A frame 10 is provided, preferably composed of channel iron which is bent together at the ends so that the main frame when connected up comprises a continuous frame member. A second longitudinal channel member 11 spaced somewhat from said member 10 is extended forwardly and rests upon a crossbar 13 bolted to the under side of the frame members 10, other crossbars 12 bolted to the top of said frame members providing supporting means for the motor and operating parts. The front part of the frame rests upon a transverse axle 14 which extends to the desired distance at either side of said frame and is provided with stud axles 15 upon which are journaled front supporting and guiding wheels 16. The rear of the frame is provided with a set of bearings 18 and 19 which are securely bolted upon the top of said frame members 10.

A single traction wheel 20 is provided with an extended tubular hub 21, which hub has a bearing portion 22 at each end thereof extended through the said bearing blocks 18 and 19 and preferably engaging roller bearings 23, as clearly shown in Fig. 3.

It will be seen that the frame 10 is suspended from the hub 21 which rests above said frame and runs on the roller bearings within the bearing blocks 18 and 19. The ends of hub 21 extend beyond said bearings at each side of the frame 10 and are provided with flat expanded disks 24.

Upon the frame 10 in front of the wheel 20 is mounted a suitable motor 25 and in front of said motor a radiator 26 cooled by a fan 27 operated by a pulley 28.

A gasolene tank 29 is mounted upon the top of the radiator.

A clutch fly wheel 30 is secured to the crank shaft of the engine and may be clutched to the driving shaft 31 extending in alinement therewith forward of the engine and between the steering wheels by means of a clutch device 32, this clutch device being operated through a lever 33 and rod 34 by means of foot lever 35.

A multiple speed transmission and reverse is provided in an inclosed casing 37 at the front of the machine, from which, through drive shaft 38 and gearing indicated by dotted lines at 39, the main drive gear 40 bolted securely to hub 21 is driven. The gearing 39 and 40 is within a dust-proof casing 41, and the upper part of traction wheel 20 is inclosed in a casing 42.

As best shown in Fig. 3, the drawbar comprises a yoke member 43 bolted at its ends to the frame members 10 and extending vertically downward beneath the same. To the corners of the yoke member 43 are secured draft straps 44 and 45, which straps extend outside of frame member 10 and surround with rings 46 and 47 the bearing blocks 18 and 19. A platform 48 is secured by means of angle irons 49 to the rear of the frame. A draft link 50 is connected with the transverse portion of yoke member 43, preferably by being passed directly through the aperture 51 therein. To this draft link the plows or harrows or other implement to be drawn by the engine may be attached. It will be seen that the draft strain from link 43 is practically all transmitted directly to the hub or axle 21 of the traction wheel 20 through the draft links 44. There is no pulling strain upon the frame 10. The motor 25 and parts connected therewith are at the front part of said frame removed from the draft portion. The various bearings for these elements can be in nowise affected by the draft upon the engine at the rear. A seat 54 is provided adjacent the platform 48. The transmission within casing 37 is controlled by links 52 and two-way lever 53 convenient to the operator. The front wheel stub axles are provided with arms 55 connected by a link 56 and are controlled for steering purposes by means of an arm 58 and link 59 pivoted to said arm and to one of arms 55, said arm 58 being fast on a segment 60 oscillated by a worm 61 on the short shaft connected by a universal joint 62 with a shaft 63 having thereon a hand wheel 64 adjacent the operator.

The traction engine as above described is in a high degree efficient for plowing, harrowing, cultivating, and in fact performing any operation in connection with farm work. The machine may be turned around with the utmost ease and in a very small space. The single traction wheel readily accommodates itself between rows of growing plants, such as corn, potatoes or cotton, and the steering wheels will run between rows at the sides. In certain soils or under certain conditions it may be desirable to provide greater support for the traction engine than will come from the traction wheel alone and at the same time increase to some extent the tractive surface available.

The disks 24 are preferably made separate from the hubs 21 and may be integrally secured thereto by means of keys 65, as clearly shown in Fig. 3. To the disks 24 may be bolted flange sections 66 of the hub 67 of separate wheels 68. The hubs 67 are preferably bored out at the center in the same manner as the hub 21, and within this bore may be placed a shaft 69 which is secured in position by keys 70. The shaft 69 floats within the hubs 21 and 67 and assists in additionally stiffening said hubs as an axle so that the several hubs and the wheels carried thereby will rotate in unison. As clearly indicated in Fig. 3, the wheels 68 are of less diameter than the traction wheel 20, which therefore receives the larger part of the weight of the rear part of the engine, so that, in turning, the engine will pivot on the center wheel, the side wheel 68 sliding in opposite directions. The said wheel 68 will be so positioned that when the machine is used for cultivating the rows of corn or other plants will be between said side wheels and the central driving wheel.

The mode of operation of our improved traction engine has been freely given in connection with the detailed description of its several parts. It will be apparent that all the working parts of the tractor are to a high degree accessible. The operator has an unobstructed view along the side of the engine and is in position readily to manipulate levers and other parts connected with the agricultural implement pulled by the engine. The frame is mainly in front of the large traction wheel, and the front part of the frame has no other function than to support the motor and parts connected therewith for operating the engine. This frame may be very rigid and strong and, not being subject to any draft strain, will provide a rigid and fixed base for the motor and operating parts, upon which bearings will never get out of alinement, so that the working life of the machine will be very much prolonged. The draft will be communicated directly from the axle or hubs 21 through the draft links 44 and 45 to the draft pin 50, which entirely avoids any racking or twisting of the frame 10 due to operating of the traction wheel on uneven ground and the transmission of the draft from the wheel through the frame of the engine. When the extra wheels 68 are employed such wheels will aid materially in holding up the machine on soft ground and at the same time, on account of their less diameter, will not interfere with the turning of the engine. The hub 21 has cast thereon oppositely disposed arms 71, 72 which are connected by place bars 73 with the tire of the traction wheel. The tractive force is therefore applied directly to the rim of the traction wheel from the hub and not through the spokes of the hub. If desired, the wheels 68 may be similarly constructed.

We claim:

1. A traction engine comprising a unitary rectangular frame formed of channel iron and provided with an intermediate longitudinal member spaced from a side of the frame, said side members of the frame being provided with bearings, a traction wheel between a side member and said intermediate member having an integral axle hub extending through said bearings by which said frame is suspended from the said axle hub, steering wheels for supporting the front end of the frame, a motor and connections for operating the traction wheel including a drive gear fast on said axle and extending into the space between the longitudinal frame member and the other side member.

2. A traction engine comprising a unitary rectangular frame formed of channel iron and provided with an intermediate longitudinal member spaced from a side of the frame, said side members of the frame being provided with bearings, a traction wheel between a side member and said intermediate member having an integral axle hub extending through said bearings by which said frame is suspended from the said axle hub, steering wheels for supporting the front end of the frame, a motor on said frame in front of the traction wheel, a set of transmission gearing on said frame in front of the motor, and connection therefrom for operating the traction wheel.

3. A traction engine comprising a unitary rectangular frame formed of channel iron and provided with an intermediate longitudinal member spaced from a side of the frame, said side members of the frame being provided with bearings, a traction wheel between a side member and said intermediate member having an integral axle hub extending through said bearings by which said frame is suspended from the said axle hub, steering wheels for supporting the front end of the frame, a motor on said frame in front of the traction wheel, a set of transmission gearing on said frame in front of the motor, and connections therefrom for operating the traction wheel including a longitudinal shaft and a drive gear fast on said axle and extending into the space between the longitudinal member and the other side member.

4. A traction engine comprising a unitary rectangular frame formed of channel iron and provided with an intermediate longitudinal member spaced from a side of the frame, said side members of the frame being provided with bearings, a traction wheel between a side member and said intermediate member having an integral axle hub extending through said bearings by which said frame is suspended from the said axle hub, steering wheels for supporting the front end of the frame, a motor on said frame in front of the traction wheel, a radiator in front of the motor, a set of transmission gearing located on the extreme front end of the frame, and connections therefrom for operating the traction wheel.

5. A traction engine comprising a frame, a single traction wheel having a live axle journaled on and extending outside of the said limits of said frame, said axle being provided with flanged heads, and supplemental traction wheels having hubs formed with flanged heads complemental to the heads on the live axle, by which said supplemental wheels are rigidly secured to and so that their hubs form an extension of the said live axle.

In testimony whereof we affix our signatures in presence of two witnesses.

GEORGE T. STRITE.
FRANK H. BIERMAN.

Witnesses:
H. A. BOWMAN,
F. A. WHITELEY.